(No Model.)
R. HAYDEN.
TACK-PULLER.
No. 258,920. Patented June 6, 1882.
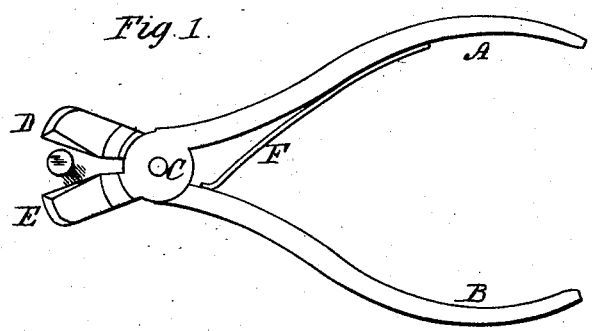
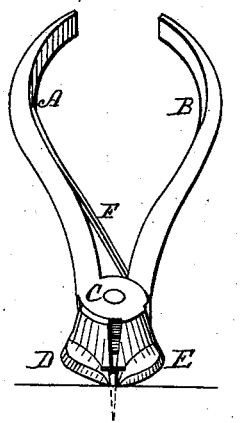
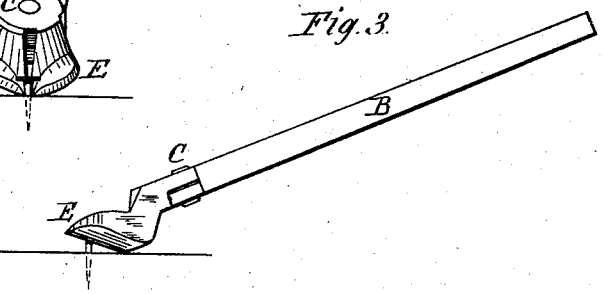
Witnesses.
Chas. L. Burdett
Edwin F. Dimock.
Inventor.
Randolph Hayden
by Theo. G. Ellis, Attorney

UNITED STATES PATENT OFFICE.

RANDOLPH HAYDEN, OF HADDAM, CONNECTICUT.

TACK-PULLER.

SPECIFICATION forming part of Letters Patent No. 258,920, dated June 6, 1882.

Application filed December 13, 1881. (No model.)

*To all whom it may concern:*

Be it known that I, RANDOLPH HAYDEN, of Haddam, in the county of Middlesex and State of Connecticut, have invented certain new and useful Improvements in Tack-Pullers; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to a new and useful implement intended to be used for the purpose of drawing carpet-tacks or other small nails. Its object is to provide a tool which shall be more rapid and effective in its operation than has heretofore been in use.

In the accompanying drawings, illustrating my invention, Figure 1 shows a top view of my improved tack-puller. Fig. 2 shows a front view of the same in the position of grasping a tack preparatory to drawing it. Fig. 3 shows a side view of the implement in the position of drawing a tack.

A and B are two handles, pivoted together at C and terminating in the jaws D and E. These jaws open and close by the action of the handles in the manner of an ordinary pair of pliers. The jaws D and E are formed at an angle with the line of the handles, as shown in Fig. 3, and are provided upon their lower and inner sides with sharp edges inclining downward at an angle suitable for being inserted under the head of a tack when driven into a carpet. These edges are slightly flaring, so that when the handles are closed so as to bring the jaws together the edges meet at the rear nearest the pivot and diverge outward somewhat in the form of an ordinary tack-claw. This flaring outward of the grasping-edges is shown more particularly in Fig. 1. In Figs. 2 and 3 the handles are brought together so that the rear ends of the jaws touch.

F is a spring between the handles for the purpose of separating and holding them apart, so that they are operated only by pressing them together from the outside.

The operation of my invention is as follows: When it is desired to draw a tack the lower edges of the jaws are brought into a horizontal position just below the outer edges of the head of the tack, and the handles are pressed together so as to force the edges under the head in the position shown by Fig. 2. The handles are then pressed downward, as shown in Fig. 3, which draws the tack.

What I claim as my invention is—

A tack-puller composed of the handles A B, held apart by the spring F, and the jaws D E, provided with sharp flaring edges set opposite each other at an angle with the line of the handles and meeting at their inner ends only, substantially as described.

RANDOLPH HAYDEN.

Witnesses:
EDWIN F. DIMOCK,
THEO. G. ELLIS.